United States Patent
Gage et al.

(10) Patent No.: US 6,466,525 B1
(45) Date of Patent: Oct. 15, 2002

(54) OPTICAL DISC DATA STORAGE SYSTEM

(75) Inventors: Edward C. Gage, Apple Valley; Ronald E. Gerber, Richfield; Ghanim A. Al-Jumaily, Columbia Heights; James E. Durnin, Apple Valley; Kevin D. Batko, Zimmerman, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/385,789

(22) Filed: Aug. 30, 1999

Related U.S. Application Data

(60) Provisional application No. 60/123,493, filed on Mar. 9, 1999.

(51) Int. Cl.$^7$ ................................................ G11B 7/00
(52) U.S. Cl. ........................... 369/44.19; 369/44.14; 369/44.23; 369/112.01
(58) Field of Search ..................... 369/44.11, 44.12, 369/44.14, 44.23, 44.17, 44.18, 44.19, 44.21, 44.28, 44.37, 112.01, 112.04, 112.27, 119

(56) References Cited

U.S. PATENT DOCUMENTS

| | | | |
|---|---|---|---|
| 4,408,311 A | 10/1983 | Suzuki et al. | 369/43 |
| 4,425,043 A | 1/1984 | Van Rosmalen | 356/375 |
| 4,460,988 A | 7/1984 | Gordon | 369/32 |
| 4,498,165 A | 2/1985 | Wilkinson, Jr. | 369/270 |
| 4,507,773 A | 3/1985 | McCann et al. | 369/110 |
| 4,566,087 A | 1/1986 | Kraft | 369/34 |
| 4,577,307 A | 3/1986 | Woods et al. | 369/270 |
| 4,581,529 A | 4/1986 | Gordon | 250/227 |
| 4,775,907 A | 10/1988 | Shtipelman | 360/106 |
| 4,794,586 A | 12/1988 | Korth et al. | 369/215 |
| 4,831,470 A | 5/1989 | Brunnett et al. | 369/75 |
| 4,860,137 A | 8/1989 | Shtipelman | 360/106 |
| 4,893,206 A | 1/1990 | Shtipelman et al. | 360/106 |
| 5,023,861 A | 6/1991 | Champagne et al. | 369/215 |
| 5,113,387 A | 5/1992 | Goldsmith et al. | 369/44.38 |
| 5,216,649 A | 6/1993 | Koike et al. | 369/44.23 |
| 5,245,491 A | 9/1993 | Horie et al. | 360/114 |
| 5,303,224 A | 4/1994 | Chikuma et al. | 369/275 |
| 5,313,332 A | 5/1994 | Schell et al. | 359/813 |
| 5,473,585 A | 12/1995 | Kim | 369/36 |
| 5,610,902 A | 3/1997 | Childers et al. | 369/289 |
| 5,677,904 A | 10/1997 | Yokota et al. | 369/244 |
| 5,815,293 A | 9/1998 | Komma et al. | 359/19 |
| 5,825,743 A | 10/1998 | Alon et al. | 369/121 |
| 5,828,054 A | 10/1998 | Schell | 250/201.5 |
| 5,828,482 A | 10/1998 | Jain | 359/211 |
| 5,881,042 A | 3/1999 | Knight | 369/99 |
| 6,160,774 A | 12/2000 | Gage et al. | 369/44.42 |
| 6,243,350 B1 * | 6/2001 | Knight et al. | 369/44.23 X |

* cited by examiner

*Primary Examiner*—Muhammad Edun
(74) *Attorney, Agent, or Firm*—Westman, Champlin & Kelly

(57) ABSTRACT

An optical data storage system includes an optical disc and an armature adjacent the disc. An optical transducer mounted on the arm provides an optical beam output directed parallel to the plane of the disc. An optical actuator mounted on the arm and positioned in the optical beam adjusts the direction of the optical beam and a mirror is positioned to direct the optical beam in a direction perpendicular to the disc and toward the disc. An optical head is positioned at a distal end of the arm and is adapted to couple the optical beam to the optical disc. An arm actuator is coupled to the arm to move the arm relative to the disc and provide coarse positioning of the optical head relative to tracks on the disc. The optical actuator provides fine adjustment of the optical beam between tracks on the disc which are proximate the optical head due to the coarse adjustment by the arm actuator.

23 Claims, 4 Drawing Sheets

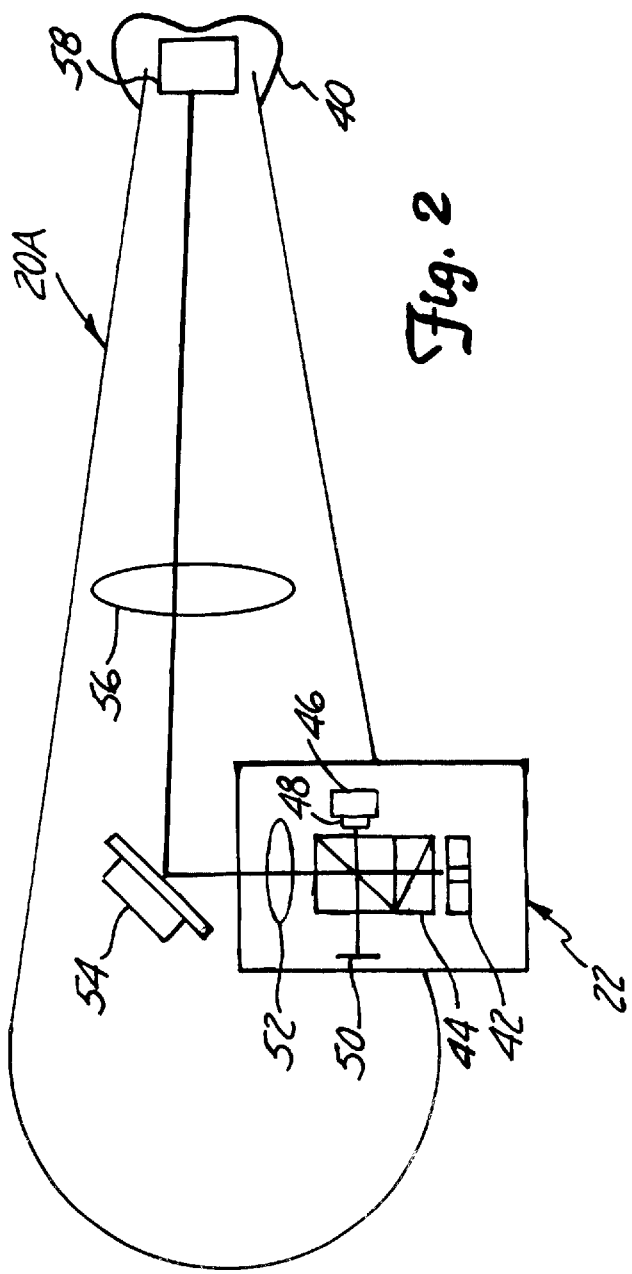
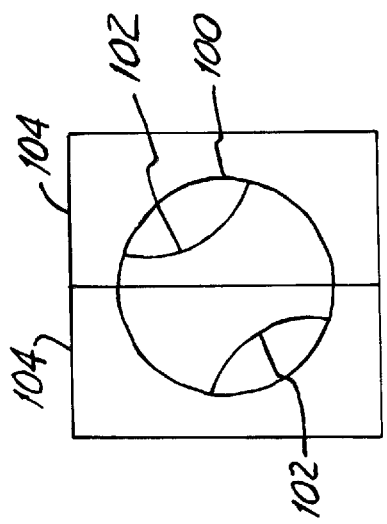
Fig. 2
Fig. 5

OPTICAL DISC DATA STORAGE SYSTEM

This application claims priority benefits from U.S. provisional patent application 60/123,493 entitled "FIXED OPTICS MODULE FOR OPTICAL DATA STORAGE" filed on Mar. 9, 1999.

BACKGROUND OF THE INVENTION

The present invention relates to optical systems. In particular, the present invention relates to optical systems in data storage devices.

Optical data storage systems access data by focusing a laser beam or other light source onto a data surface of a medium and analyzing the light reflected from or transmitted through the medium. In general, data is stored in optical storage systems in the form of marks carried on the surface of the medium which are detected using a reflected laser light.

Compact discs, which are widely used to store computer programs, music and video, are one type of optical data storage system. Typically, compact discs are permanently recorded during manufacture by stamping the surface of the compact disc. Another type of optical system is a write once read many (WORM) system in which a user may permanently write information onto a blank disc. Other types of systems are erasable, such as phase change and magneto-optic (M-O) systems. Phase change systems detect data by sensing a change in reflectivity. M-O systems read data by measuring the rotation of the incident light polarization due to the magnetic state of the storage medium.

In many prior art optical disc storage systems, the optical head is carried on a mechanical actuator which moves the head across the disc surface. In some more recent data storage systems, the optical head is carried on a slider which flies over the surface of the disc and is located at the end of an actuator arm. A significant portion of the optics in such systems is not carried on the armature. Instead, much of the optics is spaced apart from the armature and light from the optics is directed to slider, for example by directing a beam toward the slider or by using an optical fiber.

SUMMARY OF THE INVENTION

An optical data storage system includes an optical disc and an armature adjacent the disc. An optical transducer mounted on the arm provides an optical beam output directed parallel to the plane of the disc. An optical actuator mounted on the arm and positioned in the optical beam adjusts the direction of the optical beam and a mirror is positioned to direct the optical beam in a direction perpendicular to the disc and toward the disc. An optical head is positioned at a distal end of the arm and is adapted to couple the optical beam to the optical disc. An arm actuator is coupled to the arm to move the arm relative to the disc and provide coarse positioning of the optical head relative to tracks on the disc. The optical actuator provides fine adjustment of the optical beam between tracks on the disc which are proximate the optical head due to the coarse adjustment by the arm actuator.

BRIEF DESCRIPTION OF THE DRAWINGS

FIG. 2 is a plan view of an armature in the disc storage system of FIG. 1 which includes a fixed optics module in accordance with the invention.

FIG. 5 is a diagram used to illustrate the effects of head skew.

DETAILED DESCRIPTION OF THE PREFERRED EMBODIMENTS

Figure 1:
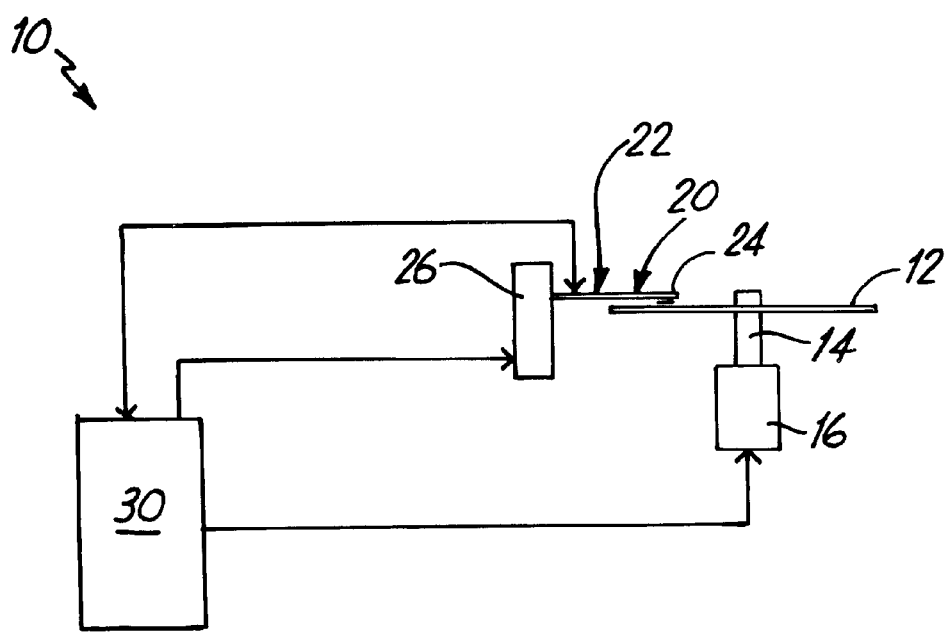
FIG. 1 is a simplified diagram of a disc drive storage system in accordance with the present invention.

FIG. 1 is a simplified block diagram of an optical disc drive storage system 10 in accordance with the present invention. Storage system 10 includes storage media 12 such as an optical disc carried on spindle 14 and rotated by spindle motor 16. An actuator arm 20 carries a fixed optics module 22 thereon having an optical head 24 positioned at a distal tip for positioning over a surface of disc 12. Armature 20 can be, for example, rotary or linearly actuated using actuator 26 and radially positioned selectively over tracks on disc 12. A controller 30 controls positioning of the head 24 using actuator 26 and spindle motor 16. Data can be read from and written to the surface of disc 12 by controller 30 using fixed optics module 22 as described below in more detail.

In a typical optical data storage system, a laser beam is focussed onto an optical disc. Because the area density of the disc varies inversely with the spot size squared, it is desirable to focus the beam to the smallest possible spot. In typical prior art optical disc storage systems, much of the optics was positioned off of the armature and the optical signal was coupled to the optical head either through a separate armature or through a fiber optic cable. Another, more complex system is shown in U.S. Pat. No. 4,794,586 issued Dec. 27, 1988 to Korth, entitled "ROTARY ACCESS ARM FOR OPTICAL DISCS" in which the laser and other optics is carried on the armature. However, the distal end of the armature is slid in an arcuate track which supports the armature and does not rely on a slider. The objective lens is positioned over tracks by actuating the armature using voice coils 6A and 6B. The prior art has also used a separate galvo mirror as a fine tracking actuator which is used to deflect the direction of the laser beam. The deflection of the beam is used to translate the beam across tracks on the disc for fine actuation. However, such systems have typically used optics which are separate from the armature.

The present invention provides an optical source such as a laser, beam-shaping and relay optics and magneto-optical detection optics for a magneto-optical disc drive in which the optical module is carried on the actuator armature.

FIG. 2 is a top plan view of armature 20 showing fixed optics module 22 and optical head 24 (not shown in FIG. 2). Optical head 24 can be carried, for example, on a slider 40 adapted to fly or be dragged over the surface of disc 12. Fixed optics module 22 includes quadrant detector 42, two-beam Wollaston prism 44, beam splitter 45, laser 46, microlens 48, front facet detector 50, a first relay lens 52, a rotatable mirror 54, a second relay lens 56 and a Turning mirror/detector 58. As illustrated in FIG. 2, all of the optical elements of fixed optics module 22 are carried on armature 20. Thus, as armature 20 is actuated by actuator 26 of FIG. 1, all of the elements are moved. This is particularly advantageous because the alignment between the various elements are fixed and do not need to be adjusted due to the translation of the armature 20 or otherwise have their alignment changed which can cause distortion or loss of focus. Further, unlike prior art techniques, the optical beam does not need to be aligned with and directed from a separate armature onto the optical head.

Figure 3:
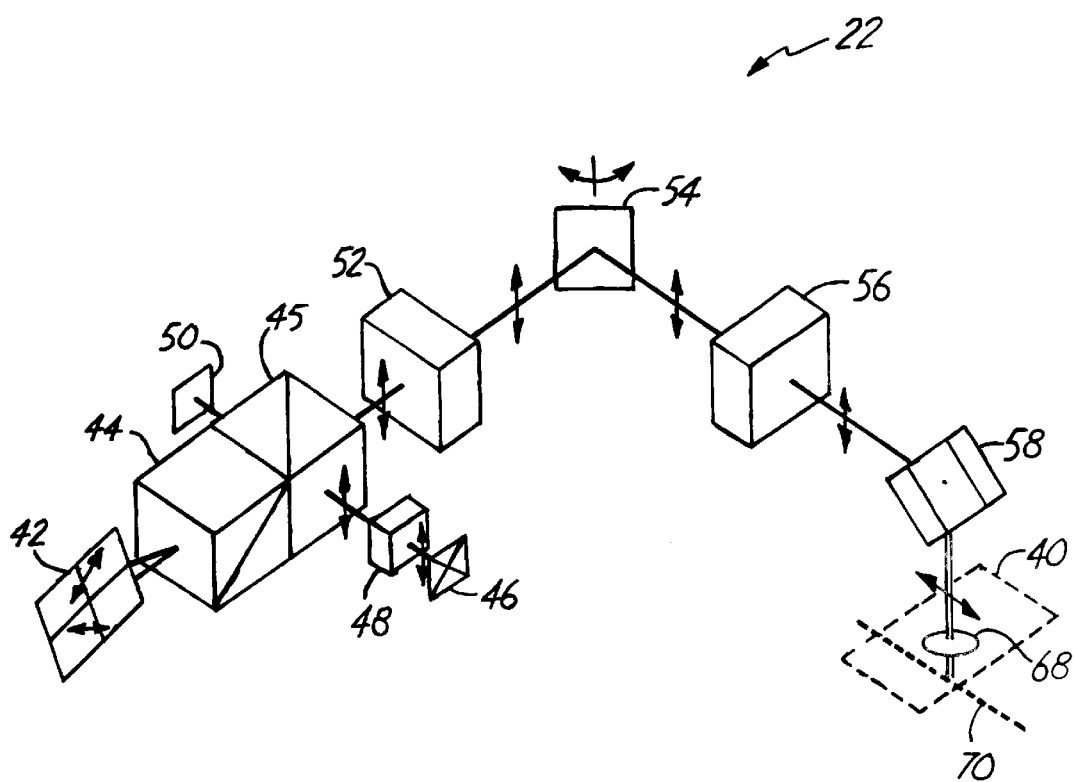
FIG. 3 is a perspective view showing the fixed optics module of FIG. 2 in greater detail.

FIG. 3 is a more detailed perspective view of fixed optics module 22 in accordance with the invention. Fixed optics module 22 includes laser 46 which comprises, for example a laser diode which generates an optical beam directed toward microlens 48. The beam emerges from microlens 48 as a circularized, diverging beam that is approximately s-polarized. The beam next passes through a beam splitter which is a "leaky" beam splitter ($R_S$=0.75, $T_S$=0.25, $R_P$=0 and $T_P$=1) that transmits roughly 25% of the optical power to a laser power monitor provided by front facet detector 50. Detector 50 is used to monitor the power output from laser 46 and provides an output to controller 30 which can adjust the beam strength or compensate for a weak beam. Approximately 75% of the optical beam from laser 46 is directed toward disc 12. The beam passes through a first relay lens 52 that causes the light to converge. The beam next reflects off of rotatable mirror 54, comes to a focus, and is collimated by second relay lens 56. Rotatable mirror 54 provides an optical actuator and is rotated by controller 30 using an actuator (not shown) to cause fine translation between beta tracks 70 carried on the surface of disc 12. The rotation of mirror 54 by controller 30 is in response to an error signal is described below.

The collimated beam next reflects off a Turning mirror/detector element 58 which reflects most of the light toward the objective lens 24 carried on slider 40 (shown in phantom in FIG. 3). Such a configuration is described in U.S. patent application Ser. No. 09/055,373, filed Apr. 6, 1998, which is incorporated herein by reference. A small portion of the outer part of the beam is used to generate a position signal such that controller 30 shown in FIG. 1 can monitor the position of the beam and responsively actuate rotatable mirror 54. Such a detector is described in U.S. patent application Ser. No. 09/268,012, filed Mar. 15, 1999 and entitled "ASYNCHRONOUS ANALOG DEMODULATOR AND METHOD FOR A NULL-TYPE SERVO PATTERN" which is incorporated herein by reference.

Next, the optical beam enters the optical head, which may contain objective lens 24, a Solid Immersion Lens (SIL), or additional optical elements. As used herein, optical head can include any or all such elements. After interacting with the disc surface, the reflected light returns through optical head 24 and retraces the path toward laser source 46. The beam splitter 45 transmits 100% of the p-polarized light (which contains the data signal) and 25% of the s-polarized light. Finally, the beam is split into two beams by two-beam Wollaston prism 44 and is collected by a quadrant detector 52. The polarization of the two beams exiting the Wollaston prism 44 are at +45° and −45° with respect to the split direction. The quadrant detector generates a magneto-optical data signal, a push-pull tracking error signal and a focus error signal. Operation of the quadrant detector is described in more detail in U.S. patent application Ser. No. 09/158,040, filed Sep. 21, 1998, entitled "APPARATUS AND METHOD FOR DIFFERENTIAL WAX-WANE FOCUSING AND PUSH-PULL TRACKING FOR MAGNETO-OPTICAL DATA STORAGE" which is incorporated herein by reference.

During operation, controller 30 moves slider 40 over the surface of disc 12 by actuating actuator 26. Fine positioning of the optical beam is through the use of an optical actuator such as rotatable mirror 54. As used herein, an optical actuator is any device which can change the direction of an optical beam.

The fixed optics module of the present invention is advantageous because the tracking functions are accomplished by moving parts that are not flying on the optical head. The rotatable mirror can be located on the arm near the pivot point and may therefore be much larger than the extremely small optical elements that fly on the optical head. Additionally, the fixed optics module can accommodate either near field or far field recording techniques, depending on the type of optical head implemented. The beam does not have to retain a Gaussian profile as it progresses through the system. The return beam in a near field recording technique, such as with a Solid Immersion Lens, is extremely non-Gaussian, and is poorly suited for use with prior art optical heads. The fixed optics module of the present invention uses free-space light delivery to the head and can accommodate near-field recording techniques.

Figure 4:
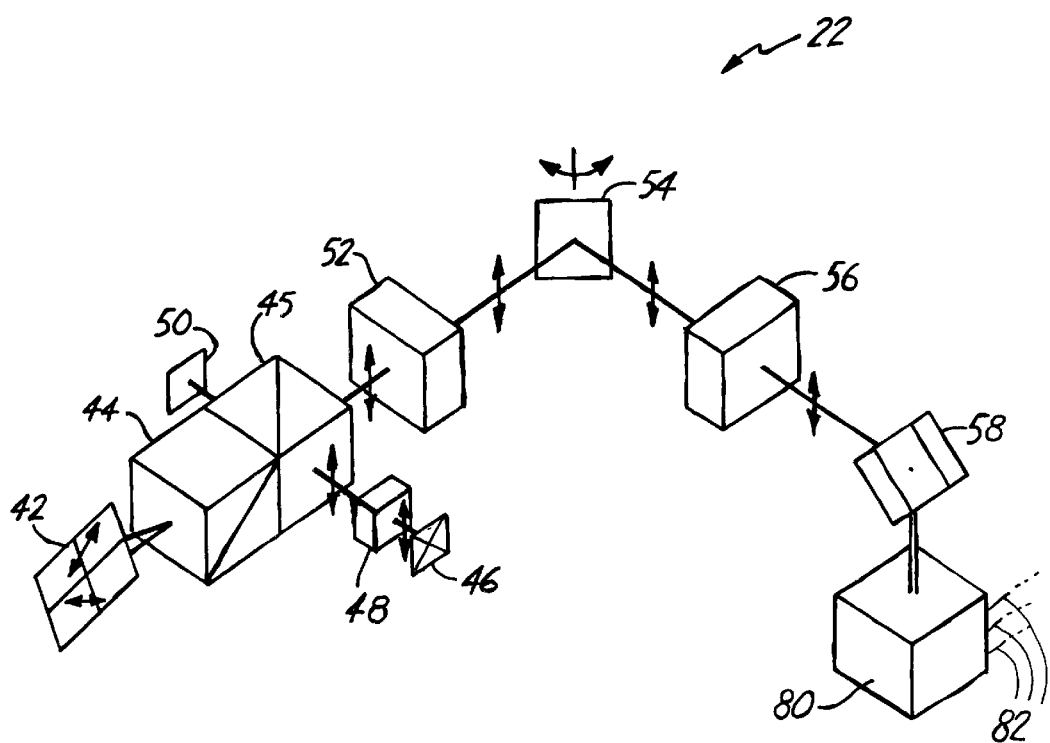
FIG. 4 is a perspective view of the fixed optics module in accordance with another embodiment of the invention.

FIG. 4 is a perspective diagram of fixed optics module 22 in accordance with another embodiment. Elements in FIG. 4 which are similar to elements in FIGS. 1–3 have retained their numbering for simplicity. In the embodiment of FIG. 4, light from the optics module 22 is directed onto an optical switch 80 instead of directly onto an optical head. Switch 80 can be used to direct the light into any one of a plurality of optical fibers 82 in a fiber bundle to deliver light to a disc surface in the disc drive 10. The switch may consist of a lens and a fiber bundle placed at a focal point of the lens. As the mirror 54 in the fixed optics module 22 rotates, the beam that enters the switch changes angles and moves between fiber tips.

In contrast to conventional beam splitter designs, the beam splitter 45 of the present invention provides a flatter response with respect to wave length of the reflectivities of each polarization state and of the phase shift between the p and s polarization. The beam splitter also achieves this improved response using fewer layers in its coating. Such a beam splitter is available from Toyocom Communication Equipment Co. Ltd. of Tokyo, Japan.

FIG. 5 illustrates an additional advantage of the present invention over the prior art with the invention, the effects of head skew can be reduced.

One quantity that affects performance is head skew, where the head skew is defined as the angle between a data track at the head and the split between the two detector elements that are used to generate the push-pull tracking error signal. In the presence of large amounts of head skew, the push-pull tracking error signal is degraded. An example of head skew is shown in FIG. 5. The circle 100 is the outline of the return beam, and the arcs 102 on the left and right sides of circle 100 subtend the region where the tracking error signal is generated. Rectangles 104 are the left and right halves of a split detector, which collects the light in the left and right halves of the beam, respectively. In the absence of head skew, the left and rights sides of the beam pattern are split symmetrically by the edge between the detector elements.

In one embodiment, the optical path along the armature is centered on the line between the actuator pivot point and the head. This design showed very little head skew (−3°) at the inner diameter of the disk, but significant head skew (+17°) at the outer diameter. The tracking performance at the outer diameter was unacceptably poor.

In a preferred embodiment, the optical path was moved away from the line that connects the pivot point and the head, and balanced the head skew between −10° at the inner diameter and +10° at the outer diameter. These head skew values showed acceptable tracking performance at both inner and outer diameters of the disk.

Although the present invention has been described with reference to preferred embodiments, workers skilled in the art will recognize that changes may be made in form and detail without departing from the spirit and scope of the invention. As used herein, "optical transducer" means any element or groups of elements which are used to generate light and sense light. In the examples set forth herein, laser 46 and quadrant detector 42 provide an optical transducer. However, those skilled in the art will recognize that optical transducers can be formed by different or additional elements.

What is claimed is:

1. An optical data storage system, comprising:
   an optical disc;
   an armature adjacent the disc;
   an optical transducer mounted on the arm providing an optical beam output directed parallel to the plane of the disc;
   an optical actuator mounted on the arm and positioned in the optical beam to adjust a direction of the optical beam;
   a mirror positioned to direct the optical beam in a direction perpendicular to the disc and toward the disc;
   an optical head at a distal end of the arm adapted to couple the optical beam to the optical disc, the optical actuator configured to provide fine adjustment of the optical beam between tracks on the disc; and
   an arm actuator coupled to the arm adapted to move the arm relative to the disc and provide coarse positioning of the optical head relative to tracks on the disc;
   wherein the optical transducer includes a laser and a beam splitter, the beam splitter directing at least a portion of an optical output from the laser as the optical beam output directed parallel to the plane of the disc and the optical output from the laser provides a diverging uncollimated beam through a lens to a surface of the beam splitter such that the optical output from the lens is reflected from the surface of the beam splitter.

2. The optical data storage system of claim 1 including a microlens positioned between the laser and the beam splitter to provide a circularized, diverging beam that is s-polarized.

3. The optical data storage system of claim 1 including a front facet detector positioned proximate the beam splitter to detect a portion of the light output from the laser and provide an output indicative of laser signal strength.

4. The optical data storage system of claim 1 wherein the optical transducer includes a two-beam Wollaston prism and a quadrant detector adapted to detect light reflected from the optical disc and provide an output related to data stored on the optical disc.

5. The optical data storage system of claim 4 wherein the Wollaston prism abuts the beam splitter, the Wollaston prism located between the beam splitter and the quadrant detector.

6. The optical data storage system of claim 4 wherein the quadrant detector is oriented at an acute angle relative to the light from the Wollaston prism.

7. The optical data storage system of claim 1 including a first relay lens causing the optical beam to converge.

8. The optical data storage system of claim 7 including a second relay lens collimating the optical beam.

9. The optical data storage system of claim 1 including a detector proximate the mirror which is positioned to direct the optical beam in a direction perpendicular to the disc, the direct detector providing a feedback signal to the optical actuator.

10. The optical data storage system of claim 1 wherein the optical actuator comprises a rotatable mirror.

11. The optical data storage system of claim 1 wherein the optical head includes an objective lens.

12. The optical data storage system of claim 1 wherein the optical head includes a Solid Immersion Lens (SIL).

13. The optical data storage system of claim 1 wherein the optical beam travels along the armature following an optical path, wherein the optical path is offset from a line which extends between a pivot for the arm and the optical head.

14. A method of moving a light beam between tracks in an optical disc, comprising:
    moving an armature positioned over the optical disc with an armature actuator, the armature carrying an optical head and a fixed optics module;
    generating the optical beam with an optical source in the fixed optics module;
    finely positioning the optical beam relative to tracks on the optical disc by actuating an optical actuator in the fixed optics module; and
    directing a portion of the output from the laser through a beam splitter and measuring signal strength of an output from the beam splitter to thereby measure signal strength of the optical beam from the laser and
    directing a portion of the optical output from the laser through a microlens such that the optical output from the microlens is reflected off the surface of the beam splitter.

15. The method of claim 14 wherein the optical actuator comprises a rotatable mirror and the step of actuating comprises rotating the rotatable mirror.

16. The method of claim 14 including controlling the step of actuating the optical actuator in response to sensing the position of the beam.

17. The method of claim 14 wherein the optical source comprises a laser.

18. The method of claim 14 including passing a reflected signal through a two-beam Wollaston prism and directing an output from the two-beam Wollaston prism at a quadrant detector to detect data carried on the disc.

19. The method of claim 18 wherein the Wollaston prism abuts the beam splitter, the Wollaston prism located between the beam splitter and the quadrant detector.

20. The method of claim 18 wherein the quadrant detector is oriented at an acute angle relative to the light from the Wollaston prism.

21. The method of claim 14 wherein the optical head includes an objective lens.

22. The method of claim 14 wherein the optical head includes Solid Immersion Lens (SIL).

23. The method of claim 14 wherein the optical beam travels along the armature following an optical path, wherein the optical path is offset from a line which extends between a pivot for the arm and the optical head.

* * * * *